W. R. STITT.
AUTOMATIC WEFT REPLENISHING MECHANISM FOR LOOMS.
APPLICATION FILED DEC. 30, 1907.

903,912.

Patented Nov. 17, 1908.

WITNESSES.
E. Howard
Joseph Bates.

INVENTOR
W. R. Stitt atty

W. R. STITT.
AUTOMATIC WEFT REPLENISHING MECHANISM FOR LOOMS.
APPLICATION FILED DEC. 30, 1907.

903,912.

Patented Nov. 17, 1908.
8 SHEETS—SHEET 2.

Fig. 2.

WITNESSES.
E. Howard
Joseph Bates.

INVENTOR.
W. R. Stitt

W. R. STITT.
AUTOMATIC WEFT REPLENISHING MECHANISM FOR LOOMS.
APPLICATION FILED DEC. 30, 1907.

903,912.

Patented Nov. 17, 1908.

WITNESSES.
E. Howard
Joseph Bates.

INVENTOR.
W. R. Stitt

W. R. STITT.
AUTOMATIC WEFT REPLENISHING MECHANISM FOR LOOMS.
APPLICATION FILED DEC. 30, 1907.

903,912.

Patented Nov. 17, 1908.

WITNESSES.
E. Howard
Joseph Bates.

INVENTOR.
W. R. Stitt
by J. O'Brien
atty

Fig. 6.

W. R. STITT.
AUTOMATIC WEFT REPLENISHING MECHANISM FOR LOOMS.
APPLICATION FILED DEC. 30, 1907.

903,912.

Patented Nov. 17, 1908.
8 SHEETS—SHEET 6.

Fig. 7.

WITNESSES
E. Howard
Joseph Bates

INVENTOR.
W. R. Stitt

Fig. 8.

W. R. STITT.
AUTOMATIC WEFT REPLENISHING MECHANISM FOR LOOMS.
APPLICATION FILED DEC. 30, 1907.

903,912.

Patented Nov. 17, 1908.

WITNESSES:
E. Howard
Joseph Bates.

INVENTOR.
W. R. Stitt

UNITED STATES PATENT OFFICE.

WILLIAM RICHARD STITT, OF BELFAST, IRELAND.

AUTOMATIC WEFT-REPLENISHING MECHANISM FOR LOOMS.

No. 903,912.   Specification of Letters Patent.   Patented Nov. 17, 1908.

Application filed December 30, 1907. Serial No. 408,590.

*To all whom it may concern:*

Be it known that I, WILLIAM RICHARD STITT, British subject, and resident of Belfast, county of Antrim, Ireland, have invented certain new and useful Improvements in Automatic Weft - Replenishing Mechanism for Looms, of which the following is a specification.

This invention relates to that class or type of automatic loom in which when the weft thread breaks or becomes exhausted or nearly so a fresh pirn or cop is inserted in the shuttle and the carrier of the broken or spent pirn or cop expelled therefrom.

The invention will be fully described with reference to the accompanying drawings forming part of the specification in which sufficient of the shuttle box end of the loom is shown to illustrate the invention.

Figure 1. end elevation of the apparatus, Fig. 2. front elevation, Fig. 3. plan, Fig. 4. end elevation partly in section, Fig. 5. end elevation partly in section with parts shown in Fig. 4. removed showing the connection with the weft fork, Fig. 6. diagrammatic perspective view with the table E and pushers G removed showing the connections of the several parts, Fig. 7. end elevation showin modified arrangement, Fig. 8. front elevation of same, Fig. 9. plan.

The loom is constructed of any ordinary construction with a shuttle box A open at both front and back to permit of a pirn bobbin or cop (hereinafter referred to as a pirn) being inserted at the front and ejected at the back, and a shuttle B and pirn C of well-known type.

A magazine D is attached to the breast beam or other stationary part of the loom frame in front of the shuttle box A to hold or contain a number of pirns C with which to replenish the shuttle. The magazine D is preferably vertical so that the pirn C will pile one on top of another though it may be more or less inclined and the inner side of the magazine may be grooved to correspond with the ribs or rings on the base of the cop holders or skewers to maintain the cops or pirns in a horizontal position as they descend through the magazine.

A table or board E is placed below the magazine upon which the bottom pirn C may rest or upon which it may fall when released. It is mounted in guides in the frame F and may be arranged to have a reciprocating movement being carried backwards and forwards with the pusher G or it may be fixed, the pusher reciprocating above it.

The reciprocating pusher or pusher block G moves above the table E and is supported in guides in the frame F, and when desired to give a sliding movement to the table E the two may be placed in frictional contact or a spring may be placed between the table and the pusher. Then as the pusher G is moved forward it carries the table E with it until the table reaches its forward position in front of the shuttle box and when the table stops the pusher continues its forward movement to project the pirn C into the shuttle B, and eject or discharge the spent pirn.

When the table E is stationary it will be set in a more advanced position and the pusher may move to and fro over its surface to push the pirn forward when a change is desired.

The pusher G is actuated by a rocking lever H pivoted on a fulcrum $h$ on the loom frame and rocked by a cam or eccentric H′ on the tappet shaft $h'$ (see Fig. 7) or other rotating part of the loom so as to be rocked for each alternate shot of the shuttle or beat up of the slay. Upon the upper end of the rocking lever H a pawl $h^2$ is pivoted which can be raised or lowered so that as the lever rocks to and fro it may engage with or pass over the pusher G as may be desired.

The pirns C are made each with a weft feeler or dectector device $c$ which will project from the end of the pirn when the weft becomes exhausted. With this weft feeler $c$ a device $e$ mounted at the side of the table E will engage when the weft requires replenishing.

To one side of the table E a rod $e$ capable of longitudinal movement is mounted which as the slay beats up projects into the shuttle in the path of the weft feeler $c$. When the weft feeler is released consequent upon the failure or exhaustion of the weft yarn the rod $e$ engages the feeler $c$ and sets the weft replenishing mechanism in motion. This mechanism may also be connected with the weft fork K by a rod $k$ so as to operate the weft replenishing mechanism when the weft yarn breaks.

The movable or sliding rod $e$ is connected by a lever $e'$ with a rotary cam $e^2$ which when the rod $e$ is operated or moved back by contact with the weft feeler $c$ is moved part of a revolution thereby freeing a pivoted catch or lever L permitting the end $l$ to fall.

The catch or lever L is pivoted to the frame F and in normal position is held by the cam $e^2$ with its end $l$ in the path of the pawl $h^2$ on the rocking lever H which causes the pawl $h^2$ to ride over the pusher G the latter remaining inoperative. When the weft feeler $c$ moves back the rod $e$ the cam $e^2$ is rotated releasing the lever or catch L and allows the end $l$ to fall thereby lowering the pawl $h^2$ on the rocking lever H until the pusher G is in its path and then as the lever H moves forward the pusher G (and with it the table E when movable) is carried forward with it forcing a fresh pirn C into the shuttle and discharging the spent one. The weft fork K is connected by the rod $k$ and fingers $k'$ $k^2$ with the lever $e'$ resting against the pin $e^3$ of the rod $e$ so that the cam $e^2$ is rotated in a similar manner when the weft breaks to insert a fresh pirn in the shuttle. The pusher G is drawn back to normal position by the rocking lever H engaging the back part of the pusher which is shaped with an adjustable screw $g$ inserted therein. A weight W is placed in the magazine D to rest upon the cops C therein with a rod $w$ extending therefrom. In the path of the rod $w$ a lever $d$ is placed on one end of a rod $d'$ which carries a finger $d^2$ at the other end. A pivoted pawl or lever M is attached to the knocking off lever $m$ the lever M being held in normal position by a trigger or pivoted catch $m'$ with which the finger $d^2$ on the rod $d'$ engages. Should therefore the pirns C all be discharged from the magazine D the weight W and rod $w$ fall and the lever $d$ the rod $d'$ and finger $d^2$ are rotated the trigger $m'$ is moved from under the pawl or lever M and it falls into the path of the slay or a fitting $m^2$ thereon and at the next beat up the knocking off lever $m$ is operated thereby to stop the loom. Instead of the latch or lever M a shutter or mechanism described in the specification of my former British patent 12889 of 1906 may be employed.

To stop the loom when the shuttle is not in the box a lever N of cranked or suitable shape is pivoted on a fulcrum on the bottom of the slay one end engaging with the swell and the other end with a finger $m^3$ on the rod $d'$ which actuates the knocking off handle in a manner similar to that above described.

A shuttle positioner N' in the form of a curved or cam plate is placed at the back of the picker and another may be placed on the sliding table to engage the shuttle and insure of it being in proper position to receive the pirn or weft carrier C, and a spring or weight or other device may be connected with the picker to draw back the picker after each shot.

Figure 1:
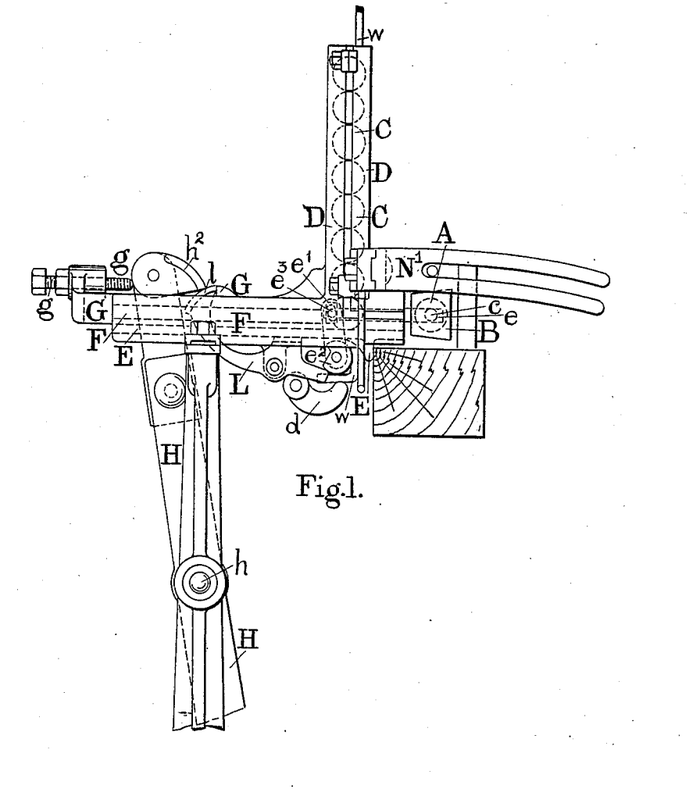
Figure 2:
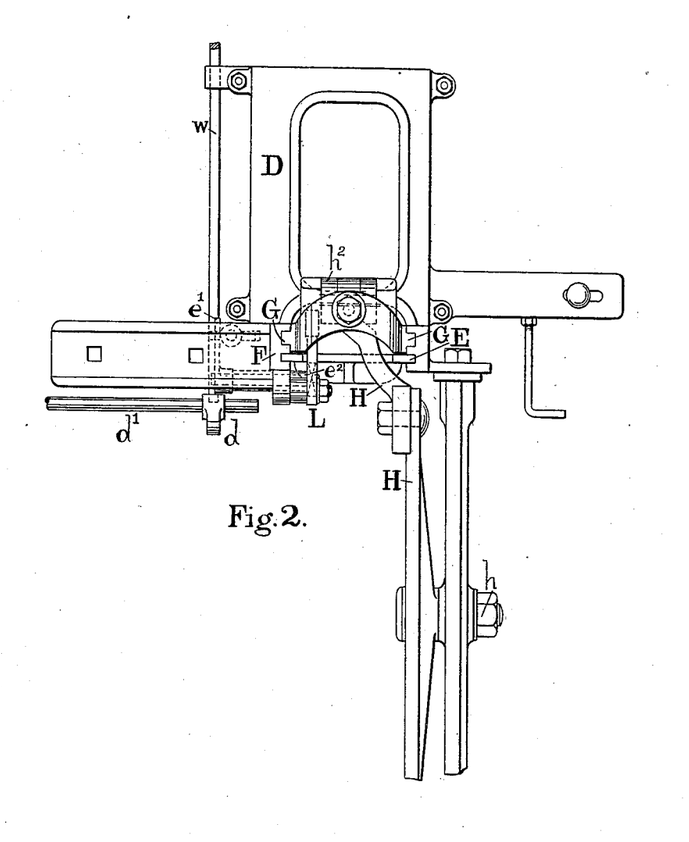
Figure 3:
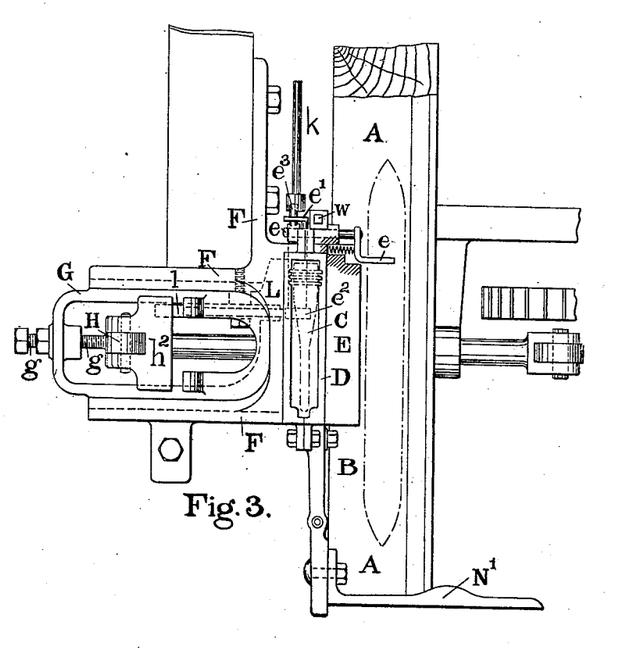
Figure 4:
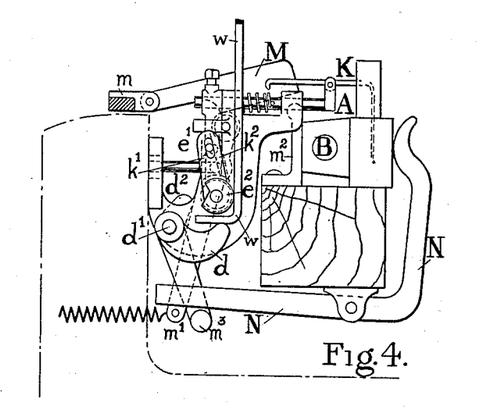
Figure 5:
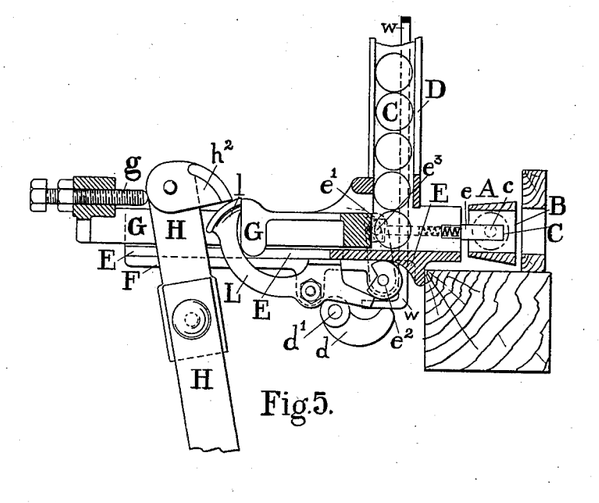
Figure 6:
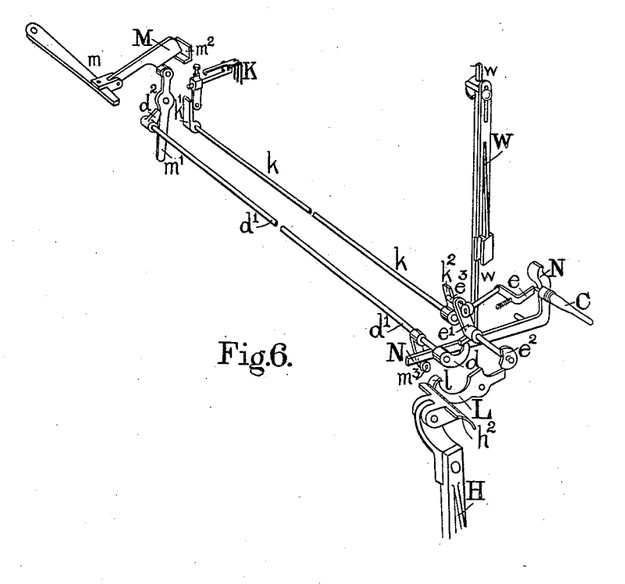
Figure 7:
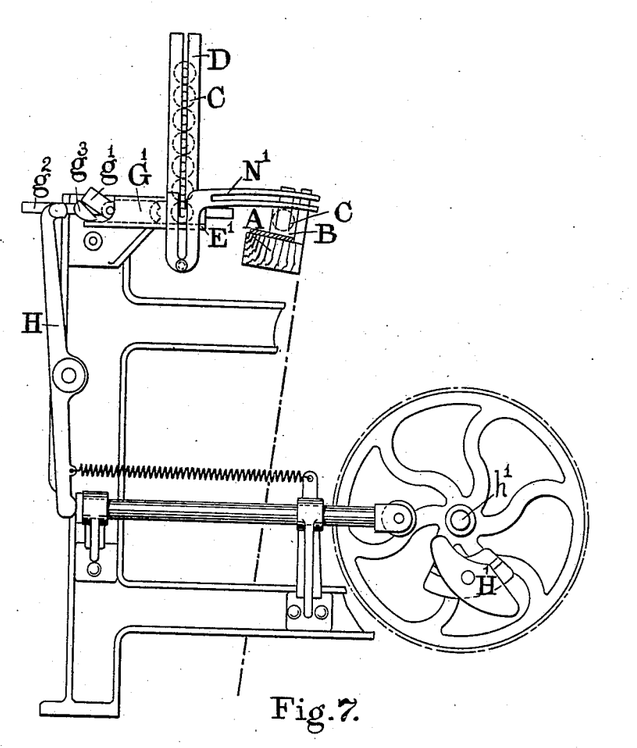
Figure 8:
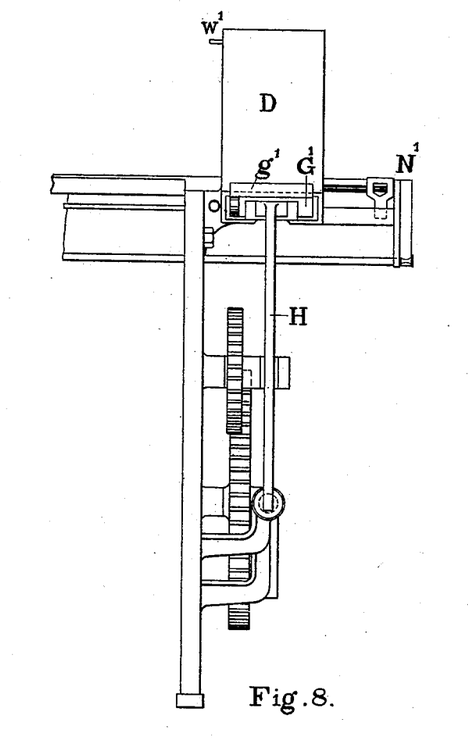
Figure 9:
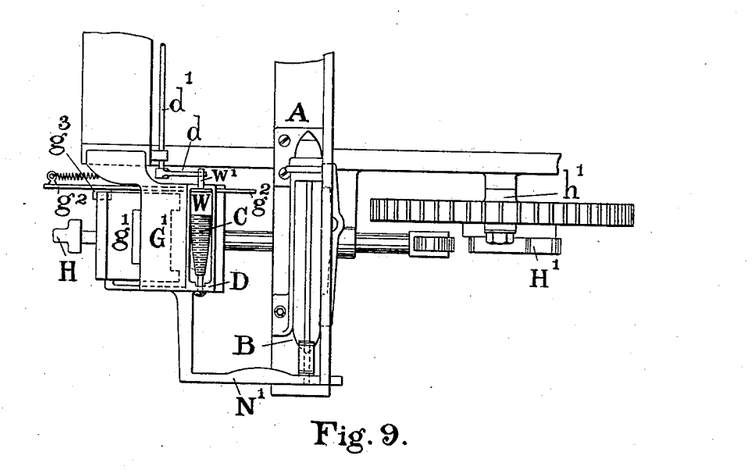

In the modification with a stationary table E' shown in Figs. 7, 8 and 9 the pusher G' rests upon the table and is provided with a latch $g'$ which can be raised or lowered out of the path of the top end of the rocking lever H. The sliding rod $g^2$ which engages the weft feeler of the pirn or weft carrier is provided with a projection $g^3$ which engages the latch $g'$ of the pusher G'. Normally the catch or projection $g^3$ on the sliding rod $g^2$ holds the latch $g'$ of the pusher G', out of the path of the end of the rocking lever H, but when the sliding rod is operated by the weft feeler in the shuttle or by the weft fork lever (in a manner similar to that already described by a rocking rod engaging a projection thereon or otherwise) the pusher latch $g'$ is dropped (or raised) into the path of the rocking lever H and the necessary movement of the pusher takes place to project the fresh cop or pirn C into the shuttle. This arrangement may also be applied to the sliding table. A weight W with projecting finger $w'$ rests upon the cops in the magazine D and is lowered as the cops are successively discharged. When the magazine is empty and the weight reaches the bottom the finger $w'$ engages the lever $d$ on the rod $d'$ and stops the loom in the manner described. The swell or lever that engages the shuttle in the box is preferably pivoted so as to engage at both ends upon the shuttle.

The shuttle guard at both ends of the loom is constructed with a slot to allow the thread to pass out with the shuttle and also into the shuttle box when a fresh pirn or weft holder is inserted in the shuttle.

A cutter in the form of a knife or shears is applied to the shuttle box or to the sliding table or on the temples or in the shuttle or in other convenient position to sever the thread when a pirn is ejected before the yarn is completely exhausted and when a fresh pirn or holder is inserted.

What I claim as my invention and desire to protect by Letters Patent is:—

1. In a weft replenishing loom the combination with the shuttle box A open both back and front a magazine D and a table beneath the magazine upon which the pirns rest of a pusher capable of reciprocating over the surface of the table, a rocking lever to which motion is given at each alternate pick, means for rocking the lever, a pawl pivoted to the upper end of the rocking lever and means for maintaining the pawl above the pusher and out of engagement therewith while the pirn remains unexhausted or unbroken substantially as described.

2. In a weft replenishing loom the combination with the shuttle box A open both back and front a magazine D and a table beneath the magazine upon which the pirns rest of a pusher capable of reciprocating over the surface of the table, a rocking lever to which motion is given at each alternate pick, means for rocking the lever, a pawl pivoted to the upper end of the rocking lever, a pivoted lever by which the pawl is held out of the path of the pusher and means to operate the lever to permit the pawl engaging with the lever when the weft is exhausted to insert a fresh pirn in the shuttle substantially as described.

3. In a weft replenishing loom the combination with the shuttle box A open both back and front and the magazine D to hold a supply of fresh pirns of a table E, below the magazine capable of reciprocating movement a frame F provided with grooves within which the table moves, a pusher G in frictional contact with the table and capable of sliding over it a rocking lever H by which the pusher is moved to and fro, a pawl pivoted to the upper end of the rocking lever a pivoted lever L by which the pawl is held above the pusher and means for operating the lever L to permit the pawl engaging with the pusher when the weft is exhausted to insert a fresh pirn in the shuttle substantially as described.

4. In a weft replenishing loom the combination with the shuttle box A open both back and front and the magazine D to hold a supply of fresh pirns of a table E below the magazine capable of reciprocating movement, a frame F provided with grooves within which the table moves, a pusher G in frictional contact with the table and capable of sliding over it a rocking lever H by which the pusher is moved to and fro, a pawl pivoted to the upper end of the rocking lever a pivoted lever L by which the pawl is held above the pusher, a rod $e$ pivoted to one side of the table E to project into the shuttle box and means by which the rod $e$ is connected to the lever L to operate the latter substantially as described.

5. A weft replenishing mechanism for looms comprising in its construction a rocking lever operated by a rotary or moving part of the loom, a reciprocating pusher with which the end of the rocking lever engages, a movable rod to enter the shuttle with which a weft feeler in the pirn may engage, and a lever operated thereby to place the sliding pusher into operative engagement with the rocking lever substantially as described.

6. In a weft replenishing loom the combination with the shuttle box A open both back and front a magazine D and a table beneath the magazine upon which the pirns rest of a pusher capable of reciprocating over the surface of the table, a rocking lever, to which motion is given at each alternate pick, means for rocking the lever, a pawl pivoted to the upper end of the rocking lever, a pivoted lever by which the pawl is held out of the path of the pusher, means to operate the lever and bring the pawl into operative engagement with the pusher when the weft is exhausted, and means to connect the said lever with the weft fork substantially as described.

7. In a weft replenishing loom the combination with the shuttle box A open both back and front a magazine D and a table beneath the magazine upon which the pirns rest of a pusher capable of reciprocating over the surface of the table, a rocking lever to which motion is given at each alternate pick, means for rocking the lever, a pawl pivoted to the upper end of the rocking lever, a pivoted lever by which the pawl is held out of the path of the pusher, means to operate the lever and bring the pawl into operative engagement with the pusher when the weft is exhausted, the pin $e^3$ the rod $k$ and the fingers $k'$ and $k^2$ by which the said lever is connected with the weft fork K substantially as described.

8. In a weft replenishing loom the combination with the shuttle box A open both back and front a magazine D and a table beneath the magazine upon which the pirns rest of a pusher capable of reciprocating over the surface of the table, a rocking lever to which motion is given at each alternate pick, means for rocking the lever, a pawl pivoted to the upper end of the rocking lever, a pivoted lever by which the pawl is held out of the path of the pusher, means to operate the lever and bring the pawl into operative engagement with the pusher when the weft is exhausted, and a shuttle positioner to enter the shuttle box and bring the shuttle into a position to receive the pirn substantially as described.

9. In weft replenishing mechanism for looms the combination with the magazine, a sliding pusher, a rocking lever, of a pivoted lever by which the rocking lever is placed in operative engagement with the pusher, means to enter the shuttle to engage a feeler on the pirn, and a rocking shaft connected therewith by which the pivoted lever is operated when the weft is exhausted substantially as described.

10. In weft replenishing mechanism for looms the combination with the magazine, a sliding pusher, a rocking lever, of a pivoted lever by which the rocking lever is placed in operative engagement with the pusher, means to enter the shuttle to engage a feeler on the pirn, and operate the lever when the weft is exhausted and a weight W placed in the magazine to descend with the pirns and means to connect the same with the lever M and knocking off lever $m$ to stop the loom when the supply of pirns is exhausted, substantially as described.

11. In a weft replenishing loom the combination with the shuttle box A open both back and front a magazine D and a table beneath the magazine upon which the pirns rest of a pusher capable of reciprocating over the surface of the table, a rocking lever to which motion is given at each alternate pick, means for rocking the lever, a pawl pivoted to the upper end of the rocking lever, a pivoted lever by which the pawl is held out of the path of the pusher, means to operate the lever and bring the pawl into operative engagement with the pusher when the weft is exhausted, the weight W placed in the magazine the connecting rod $w$ with which the weight engages, a lever $d$ on a rod $d'$ operated by the rod $w$, a lever $d^2$ on the rod $d'$, a trigger $m'$ and catch M operated thereby to release the knocking off lever $m$ substantially as described.

12. In a weft replenishing loom the combination with the shuttle box A open both back and front and the magazine D to hold a supply of fresh pirns of a table E below the magazine capable of reciprocating movement, a frame F provided with grooves within which the table moves, a pusher G in frictional contact with the table and capable of sliding over it a rocking lever H by which the pusher is moved to and fro, a pawl pivoted to the upper end of the rocking lever, a rod $e$ pivoted to one side of the table E to project into the shuttle box and means by which the rod $e$ is connected to the lever L to operate the latter, the weight W placed in the magazine the connecting rod $w$ with which the weight engages a lever $d$ on a rod $d'$ operated by the rod $w$, a lever $d^2$ on the rod $d'$, a trigger $m'$ and catch M operated thereby to release the knocking off lever $m$ substantially as described.

In witness whereof, I have hereunto signed my name in the presence of two subscribing witnesses.

WILLIAM RICHARD STITT.

Witnesses:
SAMUEL CLOTWORTHY,
JAMES CULBERT.